(12) United States Patent
Srour

(10) Patent No.: US 9,787,348 B2
(45) Date of Patent: Oct. 10, 2017

(54) COLLAPSIBLE AND EXPANDABLE SPRING-LOADED DISCS

(71) Applicant: Ikey Srour, Brooklyn, NY (US)

(72) Inventor: Ikey Srour, Brooklyn, NY (US)

( * ) Notice: Subject to any disclaimer, the term of this patent is extended or adjusted under 35 U.S.C. 154(b) by 0 days.

(21) Appl. No.: 15/464,407

(22) Filed: Mar. 21, 2017

(65) Prior Publication Data

US 2017/0195000 A1    Jul. 6, 2017

(51) Int. Cl.
*H04B 1/38* (2015.01)
*H04B 1/3888* (2015.01)
*H04M 1/15* (2006.01)
*H04M 1/04* (2006.01)

(52) U.S. Cl.
CPC ............ *H04B 1/3888* (2013.01); *H04M 1/04* (2013.01); *H04M 1/15* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,736,285 B2 * | 5/2004 | Stewart-Stand | .......... | A45F 3/20 206/218 |
| 8,186,642 B2 * | 5/2012 | Weiss-Vons | ......... | B65H 75/143 248/205.5 |
| 8,317,046 B2 * | 11/2012 | Vanderberg | ............... | F25D 3/06 220/6 |
| 8,560,031 B2 | 10/2013 | Barnett et al. | | |
| 8,737,066 B1 * | 5/2014 | Block | ........................ | A45F 5/00 224/217 |
| 2012/0042476 A1 * | 2/2012 | Karmatz | ................ | B25G 1/102 16/421 |
| 2014/0317329 A1 * | 10/2014 | Barnett | ................. | G06F 1/1632 710/304 |
| 2015/0077927 A1 * | 3/2015 | Barnett | ................. | G06F 1/1626 361/679.43 |

* cited by examiner

*Primary Examiner* — Junpeng Chen
(74) *Attorney, Agent, or Firm* — Michael J. Feigin, Esq.; Feigin and Fridman

(57) ABSTRACT

Two circular rings or discs which are somewhat rotatable with respect to one another. They are connected by a foldable cover which houses a spring inside. The spring, when collapsed, pushes the discs away from each other while the foldable cover is semi-flexible. When the accessory is collapsed, the foldable cover folds over itself, whereas when the accessory is expanded, the foldable cover becomes unfolded with a smaller-circumference center ridge which is less flexible or non-flexible, and situated between two larger circumference areas. Flanges on the inner and outer rings abut each other, keeping the spring collapsed and discs locked into each other in some embodiments. When the rings are rotated with respect to one another, the flanges become unlocked and the spring separates the discs such that one or both of the foldable cover or spring become the limiting factor in how far apart the discs spread from another.

13 Claims, 5 Drawing Sheets

COLLAPSIBLE AND EXPANDABLE SPRING-LOADED DISCS

FIELD OF THE DISCLOSED TECHNOLOGY

The disclosed technology relates generally to phone accessories, and more specifically, to phone accessories with changeable sizes.

SUMMARY OF THE DISCLOSED TECHNOLOGY

An expandable and collapsible accessory of embodiments of the disclosed technology has an outer circular disc ("outer" with respect to an "inner" disc) with a circular wall rising therefrom. A "circular disc" for purposes of this disclosure is defined as a shape which has two generally flat and equal sides in the shape of a circle which are on opposite sides from each other. A plurality of flanges extend inwards from the circular wall to the circular disc. A "circular wall" is one which is circular in shape and extends from a circular disc in a direction perpendicular to the elongated flat circular sides. The circular wall can have a diameter/circumference less than or equal to that of the circular disc it rises from.

An inner circular disc ("inner" with respect to the "outer" disc) has a circular wall rising therefrom and a plurality of flanges extending outward from the circular wall of the inner circular disc. The flanges of the inner or outer discs can extend in a direction perpendicular to the most elongated length of the respective wall, which is, in embodiments, parallel to the respective circular disc. The flanges can be spaced apart from each other, so that there are alternating flanges and spaces between each two flanges.

A spring positioned between the outer circular disc and the inner circular disc applies pressure against both the inner and outer circular discs. A flexible cover attached to the outer circular disc at a first end and the inner circular disc at a second end opposite the first end envelopes (defined as "completely surrounds" or "completely covers from view, when looking at the device from the outside) the spring.

Another circular disc can act as a cover with indicia displayed thereon. Such a cover is interchangeable in some embodiments, and covers at least a majority of one side of one of the outer circular discs or the inner circular disc. The cover circular disc, in embodiments of the disclosed technology, has two identically sized circular sides and a width therein less than a width of a widest region of the outer circular disc.

The flexible cover is bifurcated at a narrow region between two wider regions, in some embodiments. The two wider regions each terminate at one of the outer circular discs and the inner circular disc. The narrow region acts as a fold point by which the wider regions fold (defined as "having elongated flat sides move towards each other") toward each other.

One can rotate the inner circular disc with respect to the outer circular disc to keep the device in a first collapsed/retracted or second expanded condition. In the collapsed condition, at least some of the plurality of flanges of the circular wall of the outer circular disc are aligned with at least some of the plurality of flanges of the circular wall of the inner circular disc. As such, the flanges of the inner circular disc are between the flanges of the outer circular disc and the outer circular disc itself, in such a configuration. Rotate again, such that the flanges of one circular wall align with a space between the flanges of another circular wall, and the spring causes the outer and inner circular disc to separate from one another into the expanded condition.

The expandable and collapsible accessory is bistable in embodiments of the disclosed technology. In a first of two bistable configurations, the inner circular disc and the outer circular disc are closer together, compared to a second of the two bistable configurations. In this first configuration, the flexible cover has sections which are folded past one another. In the second of the two bistable configurations, the inner circular disc and the outer circular disc are further away from each other compared to the first of the two bistable configurations. Further, in the second configuration, the flexible cover and the sections are unfolded with respect to one another.

Described another way, a complimentary (defined as "one fitting at least partially inside the other") pair of first and second discs are rotatable with respect to one another and connected by way of a flexible cover extending therebetween. Each has a set of alternating flanges and spaces between the flanges which extend perpendicular to the walls of each of the first and second discs. A spring between the pair of discs exerts force on each of the discs and is covered by a flexible cover.

The spring can be held in a collapsed state such that the set of said alternating flanges of the first disc exert pressure against the set of said alternating flanges of the second disc due to the spring pushing the flanges into each other. The spring can be released into, or is in, an expanded state where the alternating flanges of the first disc are spaced apart when the areas between the alternating flanges of the second disc are aligned.

A removable third disc without flanges is attached to a circular side of the first disc, in some embodiments. At the same time, the circular side of the second disc can be attached to a phone or phone case such that the third disc is in parallel with the side of the phone or phone case attached to the second disc.

The cover folds over itself (defined as "forming a zigzag pattern of material with acute angles less than 15 degrees between each zig and zag") when the complimentary pair of first and second discs are brought closer together. The cover is unfolded (defined as "lacking acute angles less than 15 degrees within the length of the cover") when the complimentary pair of first and second discs are brought away from each other. The cover also has, in embodiments of the disclosed technology, a circular central region which is less flexible than regions of said cover which fold over each other, and in said unfolded condition, has a smaller circular circumference than adjacent regions of said cover.

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

An expandable and collapsible accessory of embodiments of the disclosed technology has two circular rings or discs which are somewhat rotatable (defined as "only less than 270 degrees without causing damage") with respect to one another. They are connected by a foldable cover which houses a spring inside. The spring, when collapsed, pushes the discs away from each other while the foldable cover is semi-flexible (defined as "able to be bent or moved with a single finger or two fingers while generally returning to its original shape when force is no longer applied by such a finger or two fingers"). When the accessory is collapsed, the foldable cover folds over itself, whereas when the accessory is expanded, the foldable cover becomes unfolded with a smaller-circumference center ridge which is less flexible or non-flexible, and situated between two larger circumference areas.

Spaced apart and/or alternating ridges or flanges on the inner and outer rings abut each other, keeping the spring collapsed and discs locked into each other in some embodiments. When the rings are rotated with respect to one another, the flanges become unlocked and the spring separates the discs such that one or both of the foldable cover or spring become the limiting factor in how far apart the discs spread from one another.

Embodiments of the disclosed technology will become more clear in view of the following description of the figures.

Figure 1A:
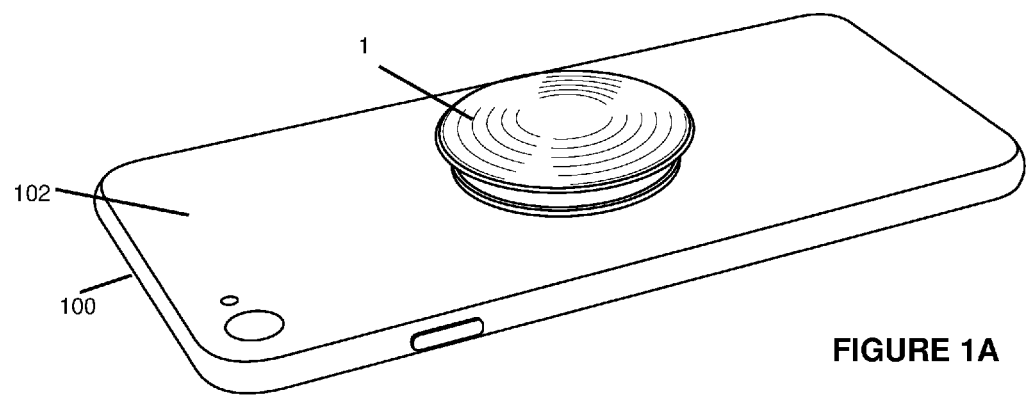
FIG. 1A shows an expandable and collapsible accessory in a collapsed condition attached to a phone or phone case in an embodiment of the disclosed technology.

FIG. 1A shows an expandable and collapsible accessory in a collapsed condition attached to a phone or phone case in an embodiment of the disclosed technology. Here the accessory has indicia 1 shown on a disc which is on an opposite side of the accessory compared to the phone 100 to which it is attached. The accessory is attached to the phone case 102 or the phone directly (in which case 102 represents the phone itself) on an elongated back side of the phone or phone case.

Figure 5:
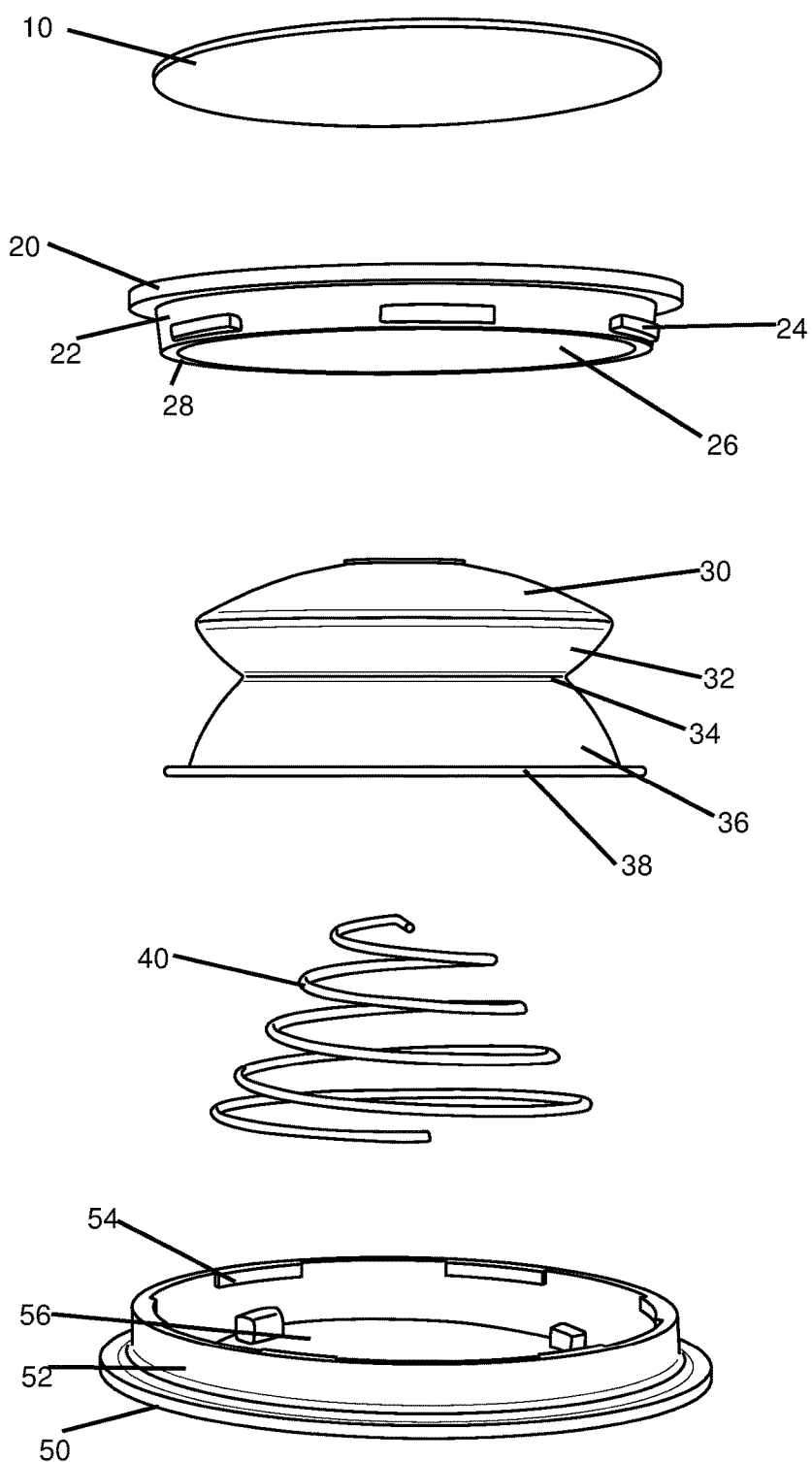
FIG. 5 shows an exploded view of the parts of an expandable and collapsible accessory in embodiments of the disclosed technology.

Skipping now to FIG. 5, FIG. 5 shows an exploded view of the parts of an expandable and collapsible accessory in embodiments of the disclosed technology. From bottom to top, there is an outer circular ring 50, a spring 40, a foldable cover 30, an inner circular ring 20, and a removable ring 10. The removable ring is shown with the indicia 1 in FIG. 1 and can be as wide as one of the circular sides of the circular ring 20 or 50, or narrower (having a small circumference/diameter). The ring 10 can also fit within a groove in the ring 20 such that it is flush with the outer most portion of the ring 20.

From the inner ring 20 is a circular side wall 22 which has a plurality (at least two) exterior extending flanges 24. The flanges extend perpendicular to the elongated length of the side wall 22, while the side wall 22 defines a cavity 26 there-between. The cavity 26 is cylindrical or generally cylindrical in embodiments of the disclosed technology. The outer ring 50 also has a side wall, side wall 52, in embodiments of the disclosed technology. This side wall again forms an integral and non-removable structure with the respective disc 50. An interior generally cylindrical cavity 56 is created within the sidewall, and a plurality (at least two) of flanges 54 extend from the side wall 52, though this time, the flanges extend to the interior of the side wall 52 rather than the exterior.

The spring 40 is compressed when the rings 20 and 50 are brought together and twisted such that the flanges 54 and 24 move past each other and then become aligned. The spring expands, or causes the expansion, when the rings 20 and 50 are aligned such that a flange 24 is unaligned with a flange 54 (the flanges of one ring (50/20) are aligned with spaces between flanges of the other ring 20/50).

The flexible cover 30 has flexible material which covers the entirety of the spring 40 for both safety and providing a place to wrap a flexible cord there-around, such as headphones. One wraps such a cord around the circular and less-flexible or non-flexible ring 34 which has a smaller circumference and diameter than the surrounding regions, a lower region 32 and an upper region 36 which are curvilinear and have greater width as they move away from the ring 34, in embodiments of the disclosed technology. The extreme sides 38 at number 30 attach to the respective adjacent circular discs 20 and 50 respectively. As the spring becomes compressed and expands, so too the flexible cover flexes and expands. As it flexes, the different regions 32 and 36 fold over one another and form very acute angles (less than 15 degrees, or in some embodiments, less than 20, 25, or 30 degrees) with respect to one another and the ring 34 becomes a point of inflection or folding. As the flexible cover 30 expands, the regions 32 and 36 become more straight (towards 180 degrees) with respect to one another.

Figure 1B:
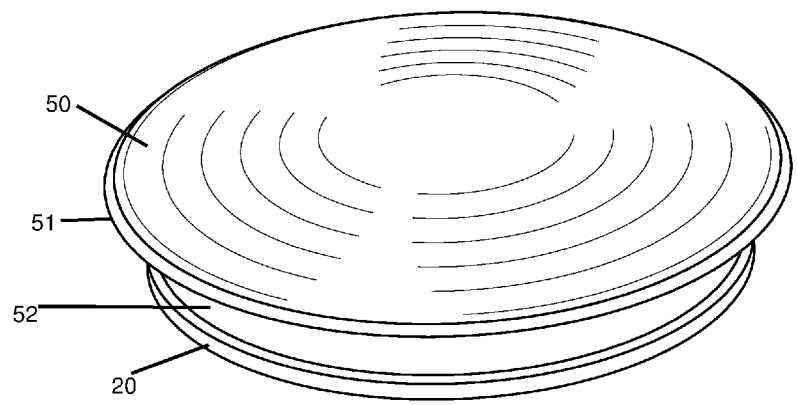
FIG. 1B shows a perspective view of an expandable and collapsible accessory in a collapsed condition in an embodiment of the disclosed technology.

FIG. 1B shows a perspective view of an expandable and collapsible accessory in a collapsed condition in an embodiment of the disclosed technology. Here, in the collapsed condition, the rings 20 and 50 are closer together to each other than in the expanded condition and the flanges are pushing against each other, due to the force exerted by the spring. A lip 51 of the outer ring 50 is the largest circumference of the device, on which a removable disc can be placed therein. In the collapsed condition, the flexible cover 30 is hidden from view, in some embodiments, with the side walls 50 of the outer, larger ring 50 covering the space, or substantially covering the space, between the discs 20 and 50.

Figure 2:
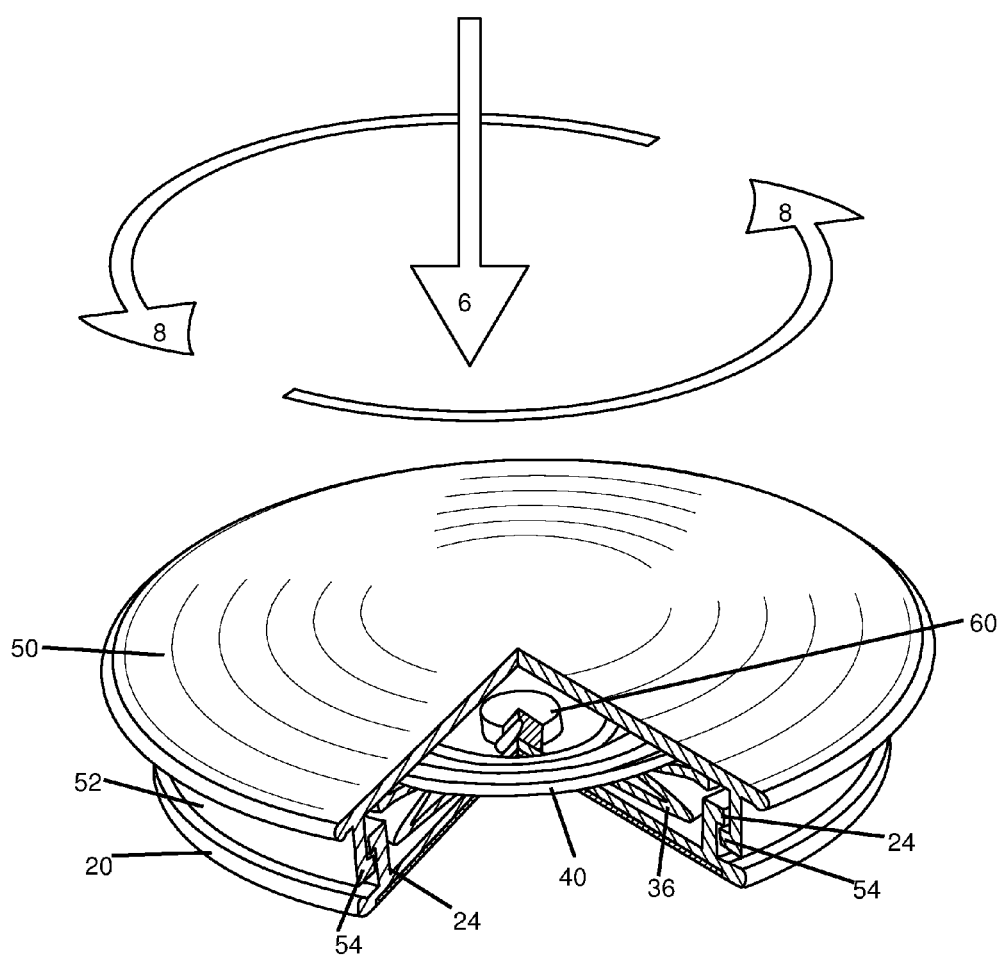
FIG. 2 shows a cutaway perspective view of an expandable and collapsible accessory in a collapsed condition in an embodiment of the disclosed technology.

FIG. 2 shows a cutaway perspective view of an expandable and collapsible accessory in a collapsed condition in an embodiment of the disclosed technology. The flanges 24 and 54 are seen abutting one another. The spring 40 is compressed such that some of the rings are concentric to each other and lie partially or fully in the same plane. The cover is folded over itself at region 36, with a point of inflection at the ring 34. A support post 60 is used to attached the spring to the disc 50 and/or 20. One can twist the discs 50 and 20 with respect to one another in a counter-clockwise or clockwise direction 8 while pressing the rings towards each other in direction 8 such that the flanges 24 and 54 move past one another in the vertical direction, and then in the horizontal direction (with respect to the directions shown on the page with FIG. 2 printed thereon). When one continues to rotate, the flanges 24 and 54 eventually become unaligned, or each aligned with a space between flanges of the other disc 20 or 50, and upon release of the downward force 9, the spring 40 causes the discs 20 and 50 to move away from one another as shown in FIG. 3.

Figure 3:
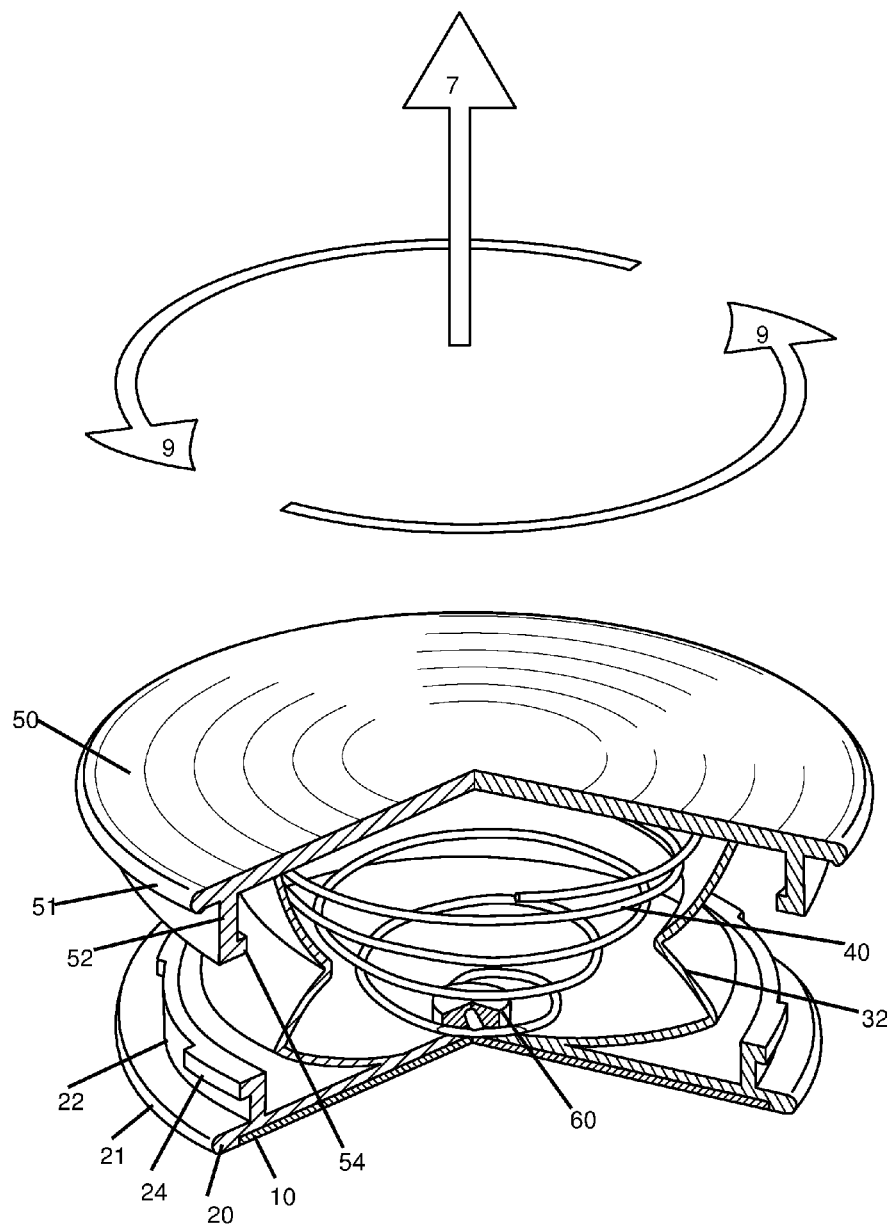
FIG. 3 shows a cutaway perspective view of an expandable and collapsible accessory in an expanded condition in an embodiment of the disclosed technology.

FIG. 3 shows a cutaway perspective view of an expandable and collapsible accessory in an expanded condition in an embodiment of the disclosed technology. Here, by way of rotation in the direction 9 (or a direction opposite this direction), and due to a force 7 exerted upwards by the spring, the two circular discs 20 and 50 separate from each other. The spring continues to separate the discs from each other until: either the spring is fully expanded and/or the cover 30 provides greater force which keeps the discs 20 and 50 together; or the ring provides greater force separating the discs.

Figure 4:
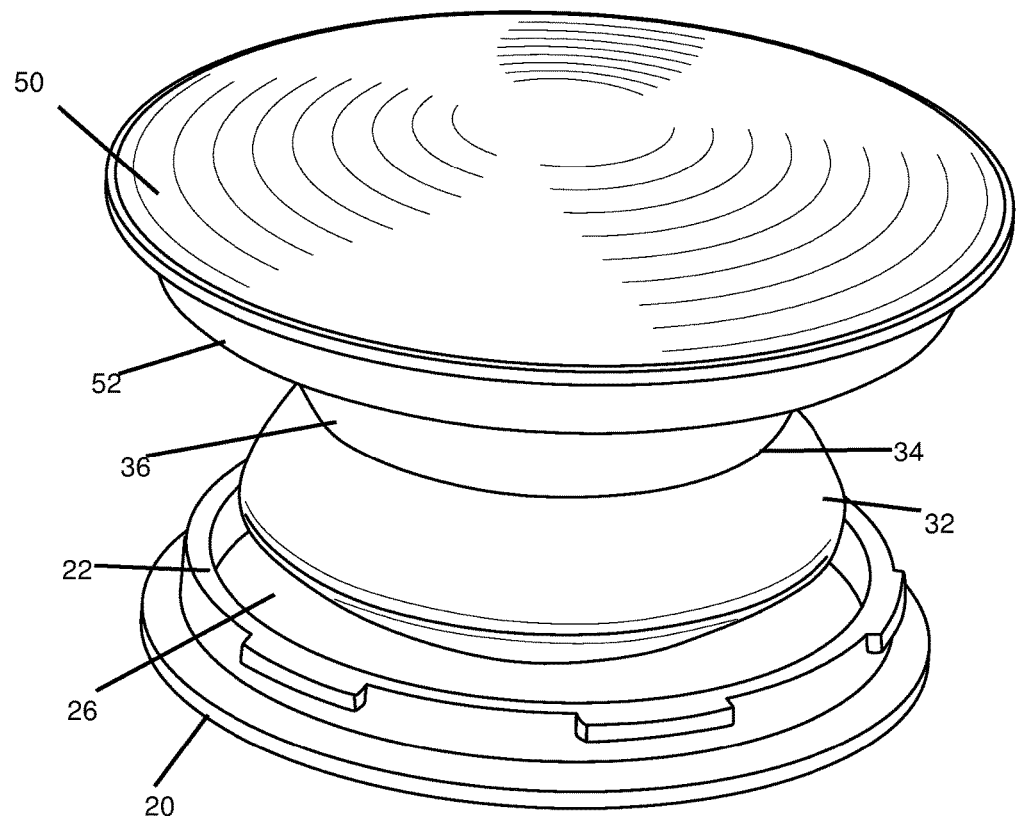
FIG. 4 shows a perspective view of an expandable and collapsible accessory in an expanded condition in an embodiment of the disclosed technology.

FIG. 4 shows a perspective view of an expandable and collapsible accessory in an expanded condition in an embodiment of the disclosed technology. Here, the cover is expanded such that the regions 32 and 36 are unfolded with respect to one another while the ring 34, of harder and less flexible construction, has a smaller cross-section compared to substantially all, or all of the regions 32 and 36. One can now wrap a cord or other pliable device around the cover 30 and then, if desired, compress the circular discs 20 and 50 back towards one another, if desired.

Further, it should be understood that all subject matter disclosed herein is directed at, and should be read only on, statutory, non-abstract subject matter. All terminology should be read to include only the portions of the definitions which may be claimed. By way of example, "computer readable storage medium" is understood to be defined as only non-transitory storage media.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

The invention claimed is:

1. An expandable and collapsible accessory comprising:
    an outer circular disc with a circular wall rising therefrom and a plurality of flanges extending inwards from said circular wall of said outer circular disc;
    an inner circular disc with a circular wall rising therefrom and a plurality of flanges extending outwards from said circular wall of said inner circular disc;
    a spring positioned between said outer circular disc and said inner circular disc;
    a flexible cover attached to said outer circular disc at a first end and said inner circular disc at a second end opposite said first end, said flexible cover enveloping said spring
    wherein said flexible cover is bifurcated at a narrow region between two wider regions, said two wider regions terminating, respectively, where said flexible cover is attached to said outer circular disc and said inner circular disc, and
    wherein said expandable and collapsible accessory is removably attached to one of a phone case or a phone.

2. The expandable and collapsible accessory of claim 1, further comprising:
    a circular disc covering at least a majority of one side of one of said outer circular disc and said inner circular disc with indicia thereupon, said cover circular disc having two identically sized circular sides and a width there-between less than a width of a widest region of said outer circular disc.

3. A method of using the expandable and collapsible accessory of claim 1, comprising a step of rotating said inner circular disc with respect to said outer circular disc until at least some of said plurality of flanges of said circular wall of said outer circular disc are aligned with at least some of said plurality of flanges of said circular wall of said inner circular disc.

4. The method of using the expandable and collapsible accessory of claim 3, wherein said rotating is until said flanges of said inner circular disc situated between said outer circular disc and said flanges of said circular wall of said outer circular disc causing said outer circular disc and said inner circular disc to remain in a stationary, first-retracted position.

5. The method of using the expandable and collapsible accessory of claim 4, comprising a further step of rotating said inner circular disc with respect to said outer circular disc until said flanges of said wall of said inner circular disc are situated adjacent to spaces between said flanges of said circular wall of said outer circular disc causing said outer circular disc and said inner circular disc to be pushed away from each other by said spring until reaching a stationary second expanded position.

6. The expandable and collapsible accessory of claim 1, wherein said expandable and collapsible accessory is bistable and:
    in a first of two bistable configurations said inner circular disc and said outer circular disc are closer together, compared to a second of said two bistable configurations, and said flexible cover has sections which are folded past one another;
    in said second of two bistable configurations, said inner circular disc and said outer circular disc are further away from each other, compared to said first of said two bistable configurations, and said flexible cover and said sections are unfolded with respect to one another.

7. An expandable and collapsible accessory, comprising:
    a complimentary pair of first and second discs, said first disc rotatable within said second disc each having a set of alternating flanges and spaces there-between said flanges, said flanges extending perpendicular to walls of each said first and second disc;
    a spring exerting force on each of said first and second discs;
    a cover extending between said first and second disc which completely surrounds said spring;
    wherein said cover is bifurcated at a narrow region between two wider regions, said two wider regions terminating, respectively, where said cover is attached to said first disc and said second disc, and
    wherein said expandable and collapsible accessory is removably attached to one of a phone case or a phone.

8. The expandable and collapsible accessory of claim 7, wherein:
    said spring is held in a collapsed state; and
    said set of said alternating flanges of said first disc exert pressure against said set of said alternating flanges of said second disc due to said spring.

9. The expandable and collapsible accessory of claim 7, wherein:
said spring is an expanded state, and
said set of alternating flanges of said first disc are spaced apart from said alternating flanges of said second disc.

10. The expandable and collapsible accessory of claim 7, wherein a removable third disc without flanges is attached to a circular side of said first disc.

11. The expandable and collapsible accessory of claim 10, wherein a circular side of said second disc is removably attached to a phone or phone case, said third disc being in parallel with a side of said phone or said phone case which is attached to said second disc.

12. The expandable and collapsible accessory of claim 7, wherein said cover folds over itself when said complimentary pair of first and second discs are brought closer together, and is unfolded when said complimentary pair of first and second discs are brought away from each other.

13. The expandable and collapsible accessory of claim 12, wherein said cover has a circular central region which is less flexible than regions of said cover which fold over each other, and in said unfolded condition, has a smaller circular circumference than adjacent regions of said cover.

* * * * *